(12) United States Patent
Zeng et al.

(10) Patent No.: US 11,750,796 B2
(45) Date of Patent: Sep. 5, 2023

(54) TOF CAMERA CALIBRATION DEVICE AND METHOD

(71) Applicant: ORBBEC INC., Guangdong (CN)

(72) Inventors: Hai Zeng, Shenzhen (CN); Xiaolong Hu, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 1 day.

(21) Appl. No.: 17/673,326

(22) Filed: Feb. 16, 2022

(65) Prior Publication Data
US 2022/0174267 A1 Jun. 2, 2022

Related U.S. Application Data

(63) Continuation of application No. PCT/CN2020/089877, filed on May 12, 2020.

(30) Foreign Application Priority Data

Aug. 30, 2019 (CN) .......................... 201910818719.9

(51) Int. Cl.
*G01S 17/894* (2020.01)
*H04N 17/00* (2006.01)
(Continued)

(52) U.S. Cl.
CPC ........... *H04N 17/002* (2013.01); *G01S 7/497* (2013.01); *G01S 17/894* (2020.01); *H04N 5/04* (2013.01);
(Continued)

(58) Field of Classification Search
CPC ........ G01S 17/894; G01S 7/497; G01S 17/89; H04N 17/002; H04N 5/04; H04N 23/54; H04N 23/695; H04N 23/90
(Continued)

(56) References Cited

U.S. PATENT DOCUMENTS

2016/0119611 A1* 4/2016 Hall ..................... H04N 13/246
348/46

FOREIGN PATENT DOCUMENTS

CN 109061609 A 12/2018
CN 109272556 A 1/2019
(Continued)

OTHER PUBLICATIONS

PCT International Search Report and Written Opinion, dated Jul. 29, 2020, issued in related International Application Mo. PCT/CN2020/089877, with partial English translation (10 pages).
(Continued)

*Primary Examiner* — Masum Billah
(74) *Attorney, Agent, or Firm* — Sheppard Mullin Richter & Hampton LLP

(57) ABSTRACT

This application provides a calibration device and a method. The calibration device includes calibration boards arranged at intervals and having board surface parallel to each other, a guide rail disposed at peripheries of the calibration boards, TOF cameras, and a controller. Support frames are arranged at intervals on the guide rail, and the TOF cameras are mounted on the guide rail using the support frames. Distances between the calibration surfaces and the corresponding TOF cameras are different. The controller is connected to the guide rail and the TOF cameras, and configured to send a first set of timing control signals to control the guide rail to carry the TOF cameras to move along the guide rail, and send a second set of timing control signals to the TOF cameras to control the TOF cameras to work simultaneously or alternately to measure distance values between the TOF cameras and the corresponding calibration boards.

12 Claims, 3 Drawing Sheets

(51) Int. Cl.
*G01S 7/497* (2006.01)
*H04N 5/04* (2006.01)
*H04N 23/54* (2023.01)
*H04N 23/90* (2023.01)
*H04N 23/695* (2023.01)

(52) U.S. Cl.
CPC ........... *H04N 23/54* (2023.01); *H04N 23/695* (2023.01); *H04N 23/90* (2023.01)

(58) Field of Classification Search
USPC ........................................................ 348/139
See application file for complete search history.

(56) References Cited

FOREIGN PATENT DOCUMENTS

| | | | |
|---|---|---|---|
| CN | 208314192 U | 1/2019 | |
| CN | 109801321 A | 5/2019 | |
| CN | 110009686 A | 7/2019 | |
| CN | 209118357 U * | 7/2019 | |
| CN | 209118357 U | 7/2019 | |
| CN | 110456331 A | 11/2019 | |
| CN | 110458900 A | 11/2019 | |
| CN | 110599547 A | 12/2019 | |
| CN | 109272556 B * | 4/2021 | ............... G06T 7/80 |
| WO | 2014/029720 A1 | 2/2014 | |

OTHER PUBLICATIONS

First Search dated Sep. 7, 2021, issued in related Chinese Application No. 201910818719.9 (1 page).

First Office Action dated Sep. 15, 2021, issued in related Chinese Application No. 201910818719.9, with English machine translation (18 pages).

* cited by examiner

TOF CAMERA CALIBRATION DEVICE AND METHOD

CROSS-REFERENCE TO RELATED APPLICATIONS

This is a continuation of International Application No. PCT/CN2020/089877, filed with the China National Intellectual Property Administration (CNIPA) on May 12, 2020, which is based on and claims priority to and benefits of Chinese Patent Application No. 201910818719.9, filed on Aug. 30, 2019. The entire content of all of the above-identified applications is incorporated herein by reference.

TECHNICAL FIELD

This application relates to the technical field of Time-of-Flight (TOF) cameras, and in particular, to a calibration device and a calibration method for a TOF camera.

BACKGROUND

TOF is a technology that achieves accurate distance measurement by measuring time of flight of light by using a characteristic where traveling speed of light is constant in the air. A TOF camera is a camera device that calculates a distance between a photographed object and the TOF camera by calculating a time difference or a phase difference between emitted light and reflected light to generate depth information. Moreover, TOF cameras have been used in fields of gesture control systems, 3D modeling systems, automotive radar systems, and robot vision systems because of the capability of simultaneously acquiring gray scale images and distance images.

However, due to the existence of system errors and random errors, a measurement result and measurement accuracy of a TOF camera may be affected by various factors such as the internal and external environment of the camera system, that is, there are measurement errors. Therefore, it is usually necessary to calibrate a depth value of the TOF camera to obtain more accurate distance information. However, an existing calibration device can calibrate only one TOF camera each time, and a calibration board needs to be moved continuously to different distances for a plurality of times of calibrations, resulting in low calibration efficiency and insufficiently accurate calibration results.

SUMMARY

Embodiments of this application overcome the disadvantages of the existing technologies and provide a calibration device for a time-of-flight (TOF) camera, which improves the calibration efficiency and accuracy of a TOF camera.

This application provides a calibration device for a TOF camera. The device includes:

a plurality of calibration boards, arranged to be spaced apart from each other at intervals and having board surfaces parallel to each other, where each of the plurality of calibration boards includes at least one calibration surface;

a guide rail, disposed at peripheries of the plurality of calibration boards;

a plurality of support frames, disposed on the guide rail and spaced apart from each other at intervals;

a plurality of TOF cameras, mounted on the guide rail by using the support frames, where each of the plurality of TOF cameras maintains a distance with a corresponding calibration surface, and the distances are different from each other; and a controller, connected to the guide rail and the TOF cameras and configured to provide a first set of timing control signals to the guide rail to control the guide rail to carry the TOF cameras to move along the guide rail, and provide a second set of timing control signals to the TOF cameras to control the plurality of TOF cameras to work, simultaneously or alternately, to measure distance values between the TOF cameras and the calibration boards corresponding to the TOF cameras.

In an embodiment, the controller is further configured to calculate compensation correction values according to the measured distance values between the TOF cameras and the corresponding calibration boards and the real distance values between the TOF cameras and the corresponding calibration boards, and compensate the measured distance values according to the compensation correction values to obtain camera calibration results.

In an embodiment, a calibration center of the calibration board coincides with light-emitting axes of the two TOF cameras located respectively on two sides of the calibration board.

In an embodiment, a distance between two adjacent calibration boards is greater than 100 mm.

This application further provides a calibration method for a TOF camera, including the following steps.

S100: assembling a calibration device for a TOF camera;

S200: a controller sends a first set of timing control signals to a guide rail, to control the guide rail to carry the TOF cameras to move along the guide rail without performing a calibration, during a non-calibration time period;

S300: when the TOF cameras moves to preset positions, the guide rail stops moving; and S400: in the calibration time period, the controller sends a second set of timing control signals to the TOF cameras to control a plurality of TOF cameras to work simultaneously or alternately in a calibration time period, to measure distances between the TOF cameras and the calibration boards corresponding to the TOF cameras to obtain measured distance values.

In an embodiment, the controller is connected to the guide rail in a wired or wireless manner, the first set of timing control signals include pulse signals, and the step S200 includes the following sub-steps.

S210: the controller controls the guide rail to carry the TOF cameras to perform stepping horizontal rotation with respect to a central axis of the guide rail;

S220: when the pulse signals of the first set of timing control signals are at a high level, the guide rail moves according to a preset direction, during the non-calibration time period; and S230: when the pulse signals of the first set of timing control signals are at a low level, the guide rail stops moving, and the distance values between the TOF cameras and the calibration boards corresponding to the TOF cameras can be measured, during the calibration time period.

In an embodiment, the controller is connected to the TOF cameras in a wired or wireless manner. the second set of timing control signals include pulse signals.

When the pulse signals of the second set of timing control signals are at a high level, the TOF cameras are turned on and are in a working state, and when the pulse signals of the second set of timing control signals are at a low level, the TOF cameras are turned off and are in a non-working state.

A voltage level of the second set of timing control signals is opposite to a voltage level of the first set of timing control signals.

In an embodiment, in the calibration time period, the controller synchronously controls all the TOF cameras to be turned on, and in the non-calibration time period, the controller synchronously controls all the TOF cameras to be turned off.

In an embodiment, in the calibration time period, the controller controls one of the two adjacent TOF cameras to be turned on, and in the non-calibration time period, the controller controls all the TOF cameras to be turned off.

In an embodiment, after step S400, the method further includes the following steps:

S500: transmitting the measured distance values measured in step S400 to the controller;

S600: the controller calculating compensation correction values according to the measured distance values between the TOF cameras and the corresponding calibration boards and the real distance values between the TOF cameras and the corresponding calibration boards; and S700: compensating the measured distance values according to the compensation correction values, to obtain camera calibration results.

Based on the device structures and the calibration methods, in the technical solution of this application, because a plurality of calibration boards are arranged to be spaced apart from each other at intervals, and a plurality of TOF cameras are arranged to be spaced apart from each other at intervals on a rail, distances between calibration surfaces of the calibration boards and the TOF cameras corresponding to the calibration surfaces are different. Therefore, during calibration, the controller sends a first set of timing control signals to control the guide rail to move the TOF cameras along the guide rail, and then the controller sends a second set of timing control signals to control a plurality of TOF cameras to work simultaneously or alternately to measure distance values between the TOF cameras and the calibration boards corresponding to the TOF cameras. In this way, compared with a current calibration method for a TOF camera, during calibration of the calibration device for a TOF camera, the calibration boards do not need to be moved. The TOF cameras to be calibrated can measure distance values between the TOF cameras and different calibration boards by controlling the guide rail to rotate for one circle, and a plurality of TOF cameras are calibrated, thereby greatly improving the calibration efficiency and accuracy of the TOF cameras.

BRIEF DESCRIPTION OF THE DRAWINGS

To describe the technical solutions in the embodiments of this application more clearly, the following briefly introduces the accompanying drawings required in the embodiments. Apparently, the accompanying drawings in the following description show merely some embodiments of this application, and a person of ordinary skill in the art may derive other drawings from these accompanying drawings without creative efforts.

DESCRIPTION OF NUMERALS OF THE ACCOMPANYING FIGURE

Figure 1:
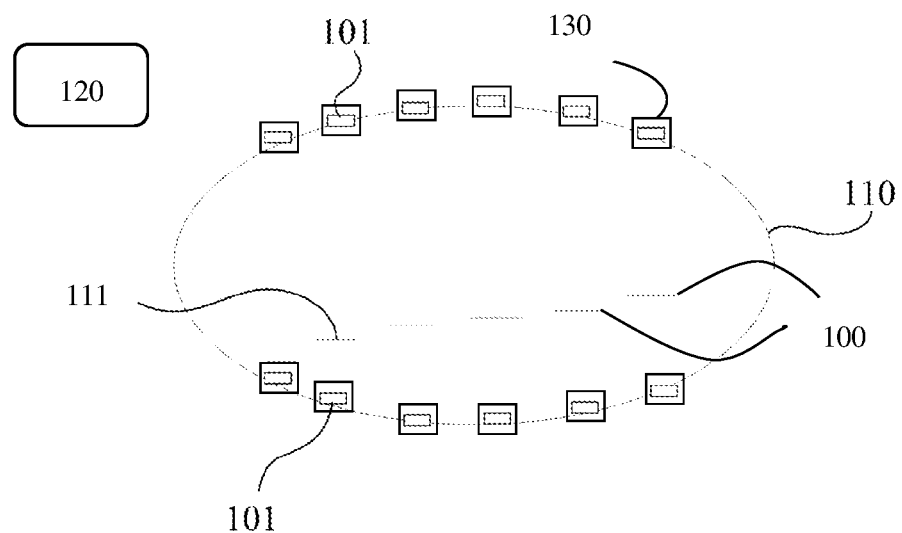
FIG. 1 is a schematic diagram of a calibration device for a TOF camera, according to an embodiment of this application.

| Marker | Name |
|---|---|
| 100 | calibration board |
| 110 | guide rail |
| 111 | calibration surface |
| 101 | TOF camera |
| 120 | controller |
| 130 | support frame |

DETAILED DESCRIPTION

To make the objectives, technical solutions, and advantages of this application clearer and more comprehensible, the following further describes embodiments of this application in detail with reference to the accompanying drawings. It should be understood that the embodiments herein are provided for describing this application and do not limit this application.

It should be noted that when an element is described as being "fixed to" or "disposed on" another element, the element may be directly located on the another element or indirectly located on the another element. When an element is described as being "connected to" another element, the element may be directly connected to the another element or indirectly connected to the another element.

It should also be noted that the terms left, right, up and down in the embodiments of this application are only relative concepts or refer to a normal use state of the product, and should not be considered as a limitation.

Detail description of the embodiments of this application will be made in the following, and embodiments thereof are illustrated in the accompanying drawings, throughout which identical or similar elements or elements of identical or similar functions are represented with identical or similar reference numerals. The following embodiments described with reference to the accompanying drawings are exemplary, to describe this application and not to limit this application.

In the description of this application, it should be understood that orientation or position relationships indicated by the terms such as "length", "width", "top", "bottom", "front", "back", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component needs have a particular orientation or needs to be constructed and operated in a particular orientation. Therefore, such terms do not limit this application.

In addition, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. In the description of this application, "plurality" means two or more, unless otherwise specifically defined.

In this application, unless otherwise clearly specified and defined, the terms "mounted," "connected," "connecting," "fixed" and other terms should be understood in a broad sense. For example, "connecting" may be a fixed connection, a detachable connection or an integrated connection; "connecting" may be a mechanical connection or an electrical connection; "connecting" may be a direct connection or an indirect connection through an intermediate medium, and a connection within two elements or an interaction relationship between two elements. A person of ordinary skill in the art may understand the specific meanings of the foregoing terms in this application according to specific situations.

The embodiments of this application provide a calibration device for a TOF camera.

Referring to FIG. 1, the calibration device for a TOF camera 101 includes calibration boards 100, a guide rail 110, TOF cameras 101, and a controller 120. The plurality of calibration boards 100 are arranged to be spaced apart from each other at intervals and have board surfaces parallel to each other, and each calibration board 100 includes at least one calibration surface 111 facing the TOF cameras 101. The guide rail 110 is disposed at the peripheries of the plurality of calibration boards 100, and a plurality of support frames 130 are disposed on the guide rail 110 and spaced apart from each other at intervals. A plurality of TOF cameras 101 are mounted on the guide rail 110 by using corresponding support frames 130 (e.g., the TOF cameras 101 are respectively mounted on the support frames 130), and distances between the TOF cameras 101 and the corresponding calibration surfaces are different. The controller 120 is connected to the guide rail 110 and the TOF cameras 101, and configured to send/provide a first set of timing control signals to the guide rail to control the guide rail 110 to carry the TOF cameras 101 to move along the guide rail, and send/provide a second set of timing control signals to the TOF cameras 101 to control the plurality of TOF cameras 101 to work simultaneously or alternately to measure distance values between the TOF cameras 101 and the calibration boards 100 corresponding to the TOF cameras 101. In addition, the controller 120 is further configured to calculate compensation correction values according to the measured distance values between the TOF cameras and the corresponding calibration boards and the real distance values between the TOF cameras and the corresponding the calibration boards, and compensate the measured distance values according to the compensation correction values to obtain camera calibration results.

Based on the device structures and the calibration method, in the technical solution of this application, a plurality of calibration boards 100 are arranged at intervals, and a plurality of TOF cameras 101 are disposed at intervals on a rail, such that distances between calibration surfaces 111 of the calibration boards 100 and the TOF cameras 101 corresponding to the calibration surfaces are different from each other. Therefore, during calibration, the controller 120 can send a first set of timing control signals to control the guide rail 110 to move the TOF cameras 101 along the guide rail 110, and then the controller 120 sends a second set of timing control signals to control the plurality of TOF cameras 101 to work simultaneously or alternately to measure distance values between the TOF cameras and the calibration boards corresponding to the TOF cameras. In this way, different from a conventional calibration method for a TOF camera, during calibration of the calibration device for a TOF camera 101, the calibration boards do not need to be moved, and the to-be-calibrated TOF cameras 101 can measure distance values between the TOF cameras and different calibration boards 100 by simply controlling the guide rail 110 to rotate/move for one circle, for a plurality of TOF cameras 101 to be calibrated, thereby greatly improving the calibration efficiency and accuracy of the TOF cameras 101.

Figure 2:
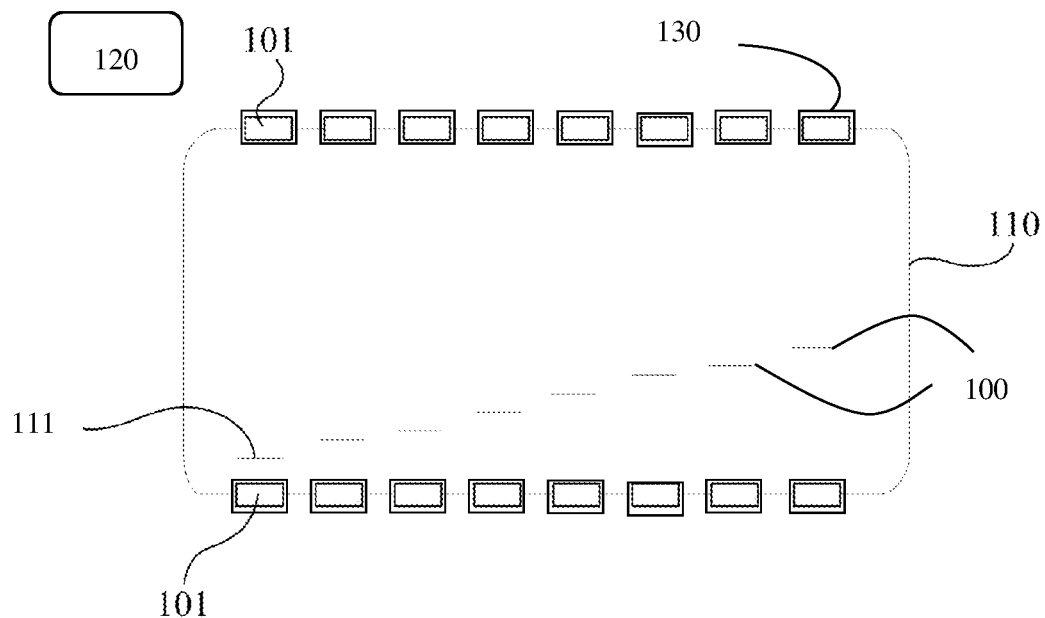
FIG. 2 is a schematic diagram of another calibration device for a TOF camera, according to an embodiment of this application.

It should be noted that, in order to facilitate circular rotation of the TOF cameras 101 on the guide rail 110, the guide rail 110 may be disposed in a ring shape, and the calibration boards 100 are located in a region inside the guide rail 110. In some embodiments, the guide rail 110 may be, but not limited to, an arc-shaped ellipse or a circle, for example. As shown in FIG. 1, the guide rail 110 is shaped as an ellipse. In another embodiment, the guide rail 110 may be in another shape. For example, in another embodiment as shown in FIG. 2, the guide rail 110 is in a square-like shape.

Further, referring to FIG. 1, in this embodiment, for each calibration board 100, two opposite board surfaces are both calibration surfaces 111, and two TOF cameras 101 corresponding to the position of the calibration board are disposed on two sides of the calibration board 100. In this way, when the TOF camera 101 rotates/moves along the guide rail 110 to face different calibration surfaces, a plurality of distance values between the TOF camera 101 and different calibration boards 100 can be measured. In other words, after the guide rail 110 rotates for one circle, each TOF camera 101 can measure a plurality of different distances for calibration to further improve the calibration efficiency of the TOF cameras 101. For example, in the following descriptions, the calibration device for a TOF camera 101 shown in FIG. 1 includes six calibration boards 100 and 12 to-be-calibrated TOF cameras 101. In the illustrated embodiment, the shortest distance between the calibration surfaces 111 and the TOF cameras 101 is 0.5 m, the longest distance is 6.0 m, and the distances between the calibration surfaces and the cameras increases sequentially by 0.5 m from the shortest distance to the longest distance. In this case, because each calibration board 100 may be provided with two opposite calibration surfaces, TOF cameras 101 may be disposed on two sides of each calibration board 100 for distance measurement. In this way, a units per hour (UPH) of calibration can be doubled compared with a conventional TOF calibration device, thereby further greatly improving the calibration efficiency.

Further, referring to FIG. 1, in this embodiment, for each calibration board 100, the calibration center of the calibration board 100 is aligned with light-emitting axes of the two TOF cameras 101 located on both sides of the calibration board. In this way, the TOF cameras 101 can correspond to a particular calibration board 100 after moving along the guide rail 110 by a step of a preset track length each time. As such, each TOF camera 101 can image at different distances after each movement, to facilitate the establishment of relationships between measured distances and real distances (pre-arranged as described above), thereby achieving the technical purpose of obtaining a more accurate depth map by correcting the measured distance.

In order to avoid interferences among the cameras, in some embodiments, a distance between two adjacent calibration boards 100 may be greater than a predetermined threshold, such as 100 mm. Certainly, a specific range of the distance may be set according to the camera performance and actual design requirements. In some embodiments, in order to make the reflectivity of the surfaces of the calibration boards 100 higher and more uniform, in this embodiment, the color of the calibration surfaces is selected as white. For example, the calibration surfaces may be made of white matte paper.

In addition, in some embodiments, the guide rail 110 is also provided with a loading and unloading opening (not shown), so the support frames can be detached/attached to the guide rail 110, and thereby the TOF cameras 101 can be load to or unload from the guide rail 110 through the loading and unloading openings. For example, the TOF camera 101 to be calibrated may be disposed on the support frames on the guide rail 110 through the loading and unloading opening, and move with the guide rail 110. In this way, the TOF cameras 101 can be conveniently mounted on the support frames on the guide rail 110, and can be easily unloaded from the loading and unloading openings after the calibration is completed, thereby improving the calibration efficiency.

Furthermore, in this embodiment, each of the TOF cameras 101 includes a light source emitting module and a photosensitive receiving module. In some embodiments, the light source emitting module includes a laser emitter. The light source emitting module is configured to emit light waves of a specific band. The emitted light waves are reflected on a surface of a to-be-measured target and received by the photosensitive receiving module. Then, the photosensitive receiving module calculates depth information of the to-be-measured target according to a time difference or a phase difference between the emitted light waves and received light waves. Therefore, in the calibration device for a TOF camera 101, a laser emitter that emits light waves of a suitable band that has a high focus and a particular anti-interference performance in the calibration environment is carefully selected.

This application further provides a calibration method for a TOF camera 101, which includes the following steps.

S100: Assembling the calibration device for TOF cameras 101 as described above.

S200: A controller 120 sends a first set of timing control signals to the guide rail 110 to control the guide rail 110 to carry the TOF cameras 101 to move along the guide rail 110 without performing a calibration, during a non-calibration time period.

S300: When the TOF cameras 101 move to preset positions, the guide rail 110 stops moving, beginning a calibration time period.

S400: In the calibration time period, the controller 120 sends a second set of timing control signals to the TOF cameras 101 to control the TOF cameras 101 to work simultaneously or alternately, to measure distances between the TOF cameras 101 and the corresponding calibration boards 100 to obtain measured distance values.

In the illustrated embodiment, based on the structure of the calibration device for the TOF camera 101, according to the calibration method for the TOF camera 101, the calibration boards 100 do not need to be moved during calibration, while a guide rail 110 rotates for one circle under the control of the controller 120. As such, TOF cameras 101 to be calibrated can measure distance values between the TOF cameras 101 to be calibrated and the different calibration boards 100, and a plurality of TOF cameras 101 are calibrated, thereby greatly improving the calibration efficiency and accuracy of the TOF cameras 101.

Figure 4:
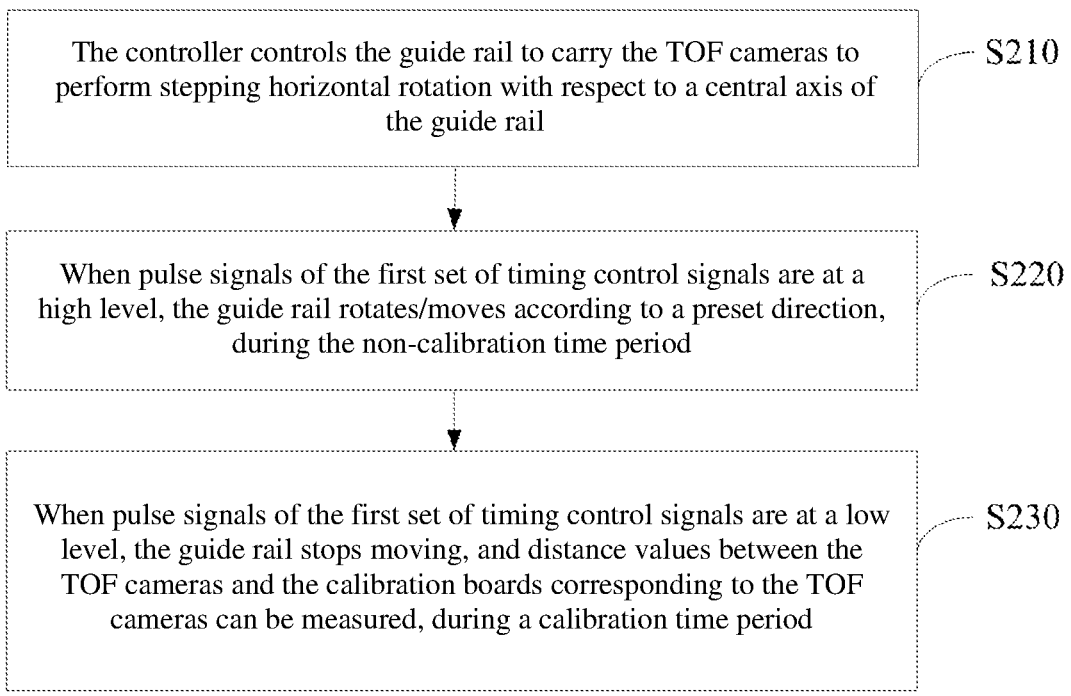
FIG. 4 is a flowchart of a calibration method for a TOF camera, according to an embodiment of this application.

Referring to FIG. 4, in an embodiment, the controller may include a host device, for example, but is not limited to, a computer. The controller 120 and the guide rail 110 may be connected in a wired manner through, but is not limited to, a USB or the like, or may be connected in a wireless manner through, but is not limited to, a wireless network or the like. Herein, the first set of timing control signals may include pulse signals that are simple and easy to be controlled, and step 5200 includes the following sub-steps:

S210: The controller 120 controls the guide rail 110 to carry the TOF cameras 101 and to perform stepping horizontal rotation with respect to a central axis of the guide rail 110.

S220: When the pulse signals of the first set of timing control signals are at a high level, the guide rail 110 rotates/moves according to a preset direction, during the non-calibration time period.

S230: When the pulse signals of the first set of timing control signals are at a low level (i.e., lower than the high level), the guide rail 110 stops moving, and the distance values between the TOF cameras 101 and the calibration boards 100 corresponding to the TOF cameras 101 can be measured, during a calibration time period.

In another embodiment, the controller 120 and the TOF cameras 101 may be connected in a wired manner through, but is not limited to, a USB or the like, or may be connected in a wireless manner through, but is not limited to, a wireless network or the like. Similarly, the second set of timing control signals may include pulse signals. For example, when the pulse signals are at a high level, the TOF cameras 101 are turned on and are in a working state to measure distances, and when the pulse signals are at a low level, the TOF cameras 101 are turned off and are in a non-working state. It can be understood that a voltage level of the second set of timing control signals may be opposite to a voltage level of the first set of timing control signals. That is, when the first set of timing control signals are at the high level, the second set of timing control signals should be at the low level. In this way, two sets of timing control signals sent by the controller 120 can enable the TOF cameras 101 to be turned on in the calibration time period, which not only avoids the waste of resources caused by turning on the TOF cameras 101 at all times, but also makes the TOF cameras 101 start measuring the distance values after the guide rail 110 stops rotating, thereby achieving a technical effect of improving the stability and accuracy of the calibration.

In an embodiment, the controller 120 synchronously controls the TOF cameras 101. For example, in the calibration time period, the controller 120 controls all the TOF cameras 101 to be turned on, and in the non-calibration time period, the controller 120 controls all the TOF cameras 101 to be turned off. In this way, after the guide rail 110 rotates for one circle, all the TOF cameras 101 can measure all the distance values with respect to the different calibration boards 100, thereby greatly improving the calibration efficiency. Certainly, in another embodiment, the controller 120 may control each TOF camera 101, such that a particular TOF camera 101 can be turned on or off individually according to specific needs.

In an embodiment, in the calibration time period, the controller 120 controls one of two adjacent TOF cameras 101 to be turned on, and in the non-calibration time period, the controller 120 controls all the TOF cameras 101 to be turned off. It can be understood that the TOF camera 101 calculates a distance between a photographed object and the TOF camera by calculating a time difference or a phase difference between the light emitted from a light source and the light received at a light sensor. In some cases, if all the cameras are turned on, interferences may be generated between adjacent cameras, that is, a TOF camera 101 may not only receive light emitted by the camera and reflected by the calibration boards 100, but may also receive light emitted by the adjacent cameras, which may cause an error in a measured distance value. In some embodiments, in a manner of turning on the cameras alternately (for example, one of two adjacent cameras is selected to be turned on), half of the TOF cameras 101 can be calibrated after the guide rail 110 rotates for one circle, and then the other half of the TOF cameras 101 is calibrated when the guide rail 110 rotates for a next circle. In this way, the problem of interferences generated when a plurality of TOF cameras 101 are calibrated can be resolved, thereby further improving the stability and accuracy of the calibration.

Figure 3:
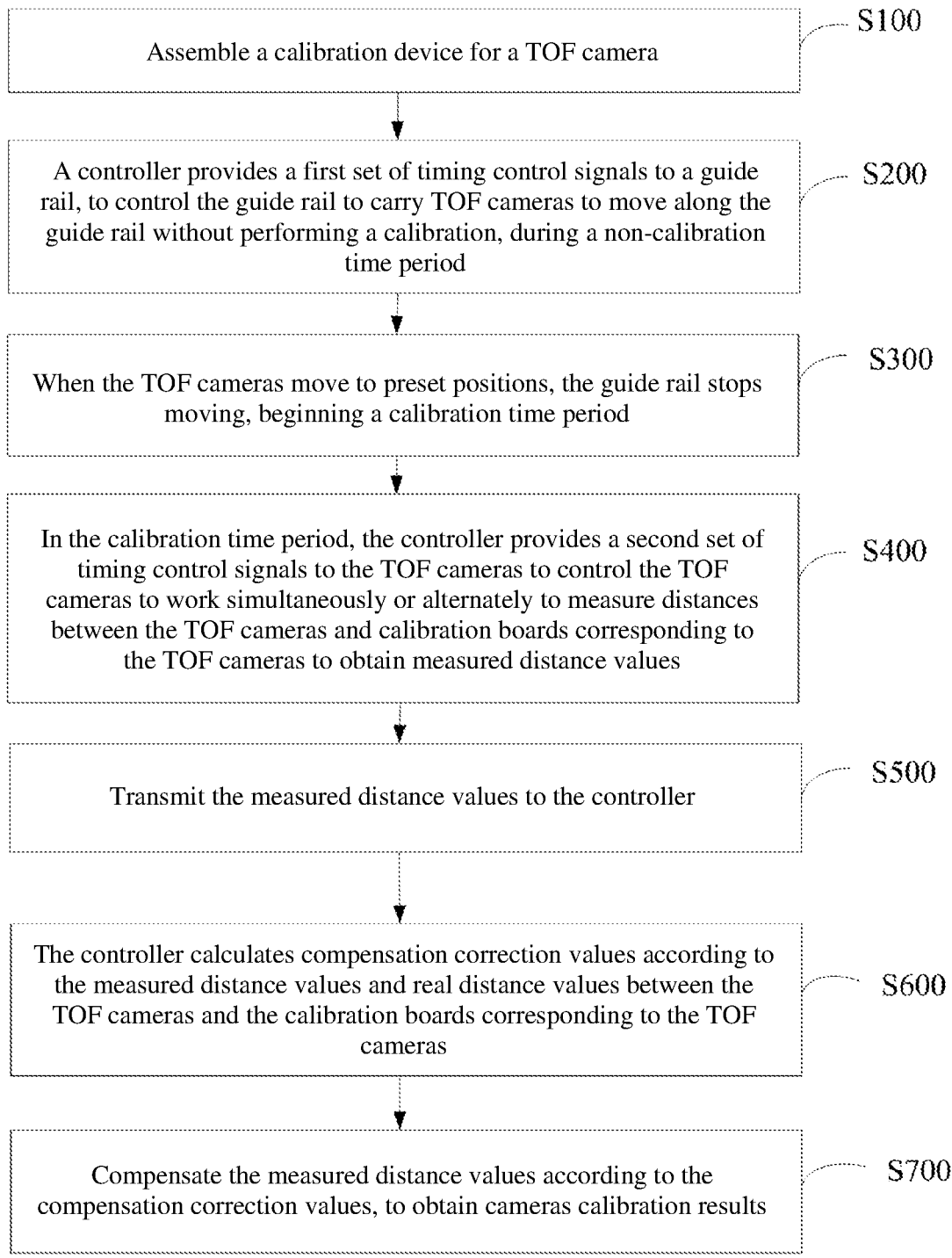
FIG. 3 is a flowchart of a calibration method for a TOF camera, according to an embodiment of this application.

Furthermore, referring to FIG. 3, in an embodiment, in order to convert distance measurement results into camera calibration results, after step S400, the method further includes the following steps.

S500: Transmitting the measured distance values measured in step S400 to the controller.

S600: The controller 120 calculates compensation correction values according to the measured distance values between the TOF cameras 101 and the calibration boards 100 corresponding to the TOF cameras and real distance values between the TOF cameras 101 and the corresponding calibration boards 100.

S700: Compensating the measured distance values according to the compensation correction values, to obtain camera calibration results.

Finally, it should be noted that all or some of the functions of the various methods in the embodiments can be implemented by hardware or by computer programs. When all or some of the functions in the embodiments are implemented by a computer program, the program may be stored in a non-volatile computer-readable storage medium, which may include: a read-only memory, a random access memory, a magnetic disk, an optical disc, a hard disk, or the like, and the program is executed by a computer to implement the functions. For example, the program is stored in a memory of the device, and when the program in the memory is executed by a processor, all or some of the functions can be implemented. In addition, when all or some of the functions in the implementations are implemented by the computer program, the foregoing contents are detailed descriptions of this application in conjunction with specific embodiments, and the specific implementation of this application is limited to these descriptions.

The foregoing descriptions are merely examples of embodiments of this application, but do not limit this application. Any modification, equivalent replacement, or improvement made without departing from the spirit and principle of this application should fall within the protection scope of this application.

What is claimed is:

1. A calibration device for a time-of-flight (TOF) camera, comprising:
   a plurality of calibration boards, arranged to be spaced apart from each other at intervals and having board surfaces parallel to each other, wherein each of the plurality of calibration boards comprises at least one calibration surface;
   a guide rail, disposed at peripheries of the plurality of calibration boards;
   a plurality of support frames, disposed on the guide rail and spaced apart from each other at intervals;
   a plurality of TOF cameras, mounted on the guide rail by using the support frames, wherein each of the plurality of TOF cameras maintains a distance with a corresponding calibration surface, and the distances are different from each other; and
   a controller, connected to the guide rail and the plurality of TOF cameras, and configured to provide a first set of timing control signals to the guide rail to control the guide rail to carry the plurality of TOF cameras to move along the guide rail, and provide a second set of timing control signals to the plurality of TOF cameras to control the plurality of TOF cameras to work, simultaneously or alternately, to measure distance values between the TOF cameras and the calibration boards corresponding to the TOF cameras.

2. The calibration device according to claim 1, wherein the controller is further configured to calculate compensation correction values according to the measured distance values between the TOF cameras and the corresponding calibration boards and real distance values between the TOF cameras and the corresponding calibration boards, and compensate the measured distance values according to the compensation correction values to obtain camera calibration results.

3. The calibration device according to claim 2, wherein a calibration center of a calibration board coincides with light-emitting axes of two TOF cameras located respectively at two sides of the calibration board.

4. The calibration device according to claim 3, wherein a distance between two adjacent calibration boards is greater than 100 mm.

5. A calibration method for a time-of-flight (TOF) camera, comprising:
   assembling a calibration device, wherein the calibration device comprises:
      a plurality of calibration boards, arranged to be spaced apart from each other at intervals and having board surfaces parallel to each other, wherein each of the plurality of calibration boards comprises at least one calibration surface;
      a guide rail, disposed at peripheries of the plurality of calibration boards;
      a plurality of support frames, disposed on the guide rail and spaced apart from each other at intervals;
      a plurality of TOF cameras, mounted on the guide rail by using the support frames, wherein each of the plurality of TOF cameras maintains a distance with a corresponding calibration surface, and the distances are different from each other; and
      a controller, connected to the guide rail and the plurality of TOF cameras,
   providing a first set of timing control signals to the guide rail, to control the guide rail to carry the plurality of TOF cameras to move along the guide rail without performing a calibration, during a non-calibration time period, and
   when the plurality of TOF cameras moves to preset positions, stopping the guide rail, and providing a second set of timing control signals to the plurality of TOF cameras to control the plurality of TOF cameras to work, simultaneously or alternately, to measure distances between the TOF cameras and the calibration boards corresponding to the TOF cameras to obtain measured distance values, during a calibration time period.

6. The calibration method according to claim 5, wherein the controller is connected to the guide rail in a wired manner or a wireless manner,
   the first set of timing control signals include pulse signals, and providing the first set of timing control signals to the guide rail comprises:
      controlling the guide rail to carry the plurality of TOF cameras to perform stepping horizontal rotation with respect to a central axis of the guide rail;

when the pulse signals of the first set of timing control signals are at a high level, controlling the guide rail to move according to a preset direction, during the non-calibration time period; and when the pulse signals of the first set of timing control signals are at a low level, controlling the guide rail to stop moving, and measuring the distance values between the TOF cameras and the calibration boards corresponding to the TOF cameras, during the calibration time period.

7. The calibration method according to claim 5, wherein the controller is connected to the plurality of TOF cameras in a wired manner or a wireless manner, the second set of timing control signals include pulse signals, providing the second set of timing control signals to the plurality of TOF cameras comprises:

when the pulse signals of the second set of timing control signals are at a high level, turning on the plurality of TOF cameras, and when the pulse signals of the second set of timing control signals are at a low level, turning off the plurality of TOF cameras; and a voltage level of the second set of timing control signals is opposite to a voltage level of the first set of timing control signals.

8. The calibration method according to claim 7, further comprising: synchronously controlling the plurality of TOF cameras to be turned on in the calibration time period, and controlling the plurality of TOF cameras to be turned off in the non-calibration time period.

9. The calibration method according to claim 5, further comprising: in the calibration time period, controlling one of two adjacent TOF cameras to be turned on, and in the non-calibration time period, controlling the plurality of TOF cameras to be turned off.

10. The calibration method according to claim 5, wherein after providing the second set of timing control signals to the plurality of TOF cameras, the method further comprises:

transmitting the measured distance values to the controller;

calculating compensation correction values according to the measured distance values between the TOF cameras and the corresponding calibration boards and real distance values between the TOF cameras and the corresponding calibration boards; and compensating the measured distance values according to the compensation correction values, to obtain camera calibration results.

11. The calibration method according to claim 5, wherein a calibration center of a calibration board coincides with light-emitting axes of two TOF cameras located respectively at two sides of the calibration board.

12. The calibration method according to claim 11, wherein a distance between two adjacent calibration boards is greater than 100 mm.

* * * * *